United States Patent
Fahlbusch et al.

(10) Patent No.: US 9,658,426 B2
(45) Date of Patent: May 23, 2017

(54) OBJECTIVE LENS MOUNT

(71) Applicant: Carl Zeiss Microscopy GmbH, Jena (DE)

(72) Inventors: Ingo Fahlbusch, Göttingen (DE); Georg Herbst, Göttingen (DE); Johannes Knoblich, Jena (DE)

(73) Assignee: CARL ZEISS MICROSCOPY GMBH, Jena (DE)

( * ) Notice: Subject to any disclaimer, the term of this patent is extended or adjusted under 35 U.S.C. 154(b) by 48 days.

(21) Appl. No.: 14/255,632

(22) Filed: Apr. 17, 2014

(65) Prior Publication Data
US 2014/0313603 A1    Oct. 23, 2014

(30) Foreign Application Priority Data

Apr. 19, 2013 (DE) .......... 10 2013 006 997

(51) Int. Cl.
| | | |
|---|---|---|
| *G02B 27/00* | (2006.01) | |
| *G02B 7/10* | (2006.01) | |
| *G02B 21/02* | (2006.01) | |
| *G02B 21/24* | (2006.01) | |

(52) U.S. Cl.
CPC ............. *G02B 7/10* (2013.01); *G02B 21/02* (2013.01); *G02B 21/24* (2013.01)

(58) Field of Classification Search
CPC ...................................................... G02B 7/102
USPC ................................................ 359/823, 819
See application file for complete search history.

(56) References Cited

U.S. PATENT DOCUMENTS

| | | | |
|---|---|---|---|
| 6,507,433 B2* | 1/2003 | Mecham et al. .............. | 359/379 |
| 2006/0164721 A1* | 7/2006 | Uhl ...................... | G02B 21/025 |
| | | | 359/368 |
| 2011/0235169 A1* | 9/2011 | Lim ...................... | G02B 21/04 |
| | | | 359/380 |

FOREIGN PATENT DOCUMENTS

| | | |
|---|---|---|
| AT | 197 096 | 4/1958 |
| JP | S56-55917 | 5/1981 |
| JP | S60-97265 | 5/1985 |

OTHER PUBLICATIONS

Search Report, German Patent and Trademark Office, German Patent Application No. 10 2013 006 997.1, dated Jun. 27, 2013.

* cited by examiner

*Primary Examiner* — James Jones
(74) *Attorney, Agent, or Firm* — Nixon Peabody LLP; Jeffrey L. Costellia (57) ABSTRACT

The invention relates to an objective lens mount (39) with specimen protection and crush protection for objective lenses (4) on a microscope, consisting of an outer objective lens collar (1) having a unit (15) for mounting on an interface of the microscope, preferably on a microscope stand, and a safety element (22) arranged spring mounted and axially movable in the objective lens collar (1), which safety element contains the objective lens (4). According to the invention, in order to maintain a definable stand-off distance between the front lens (5) of the objective lens (4) and the safety element (22) in the objective lens mount (39), a sensor (6) is provided, coupled to a control unit.

14 Claims, 7 Drawing Sheets

OBJECTIVE LENS MOUNT

The invention relates to an objective lens mount with specimen protection and crush protection for objective lenses, in particular, objective lenses on a microscope, with said lens mount consisting of an outer, rigid objective lens collar with a unit for mounting on an interface of the microscope and a mounting tube, which is arranged spring-mounted and axially movable in the objective lens collar and contains the objective lens.

As processes for openly accessible microscopes become increasingly automated and motorized, objective lenses carry with them the risk that an operator's finger may become crushed between objective lens and specimen, for example, during focusing.

Various solutions for objective lens mounts with specimen protection, or objective lens protection, designed to prevent accidents of this type are known in the prior art, in which an inner, primarily spring-mounted, movable mounting tube, which contains the objective lens and which retracts relative to a rigid objective lens bell when contact is made with the objective lens, thereby preventing damage to the specimen or to the objective lens.

For example, DD 274687 A1 describes an objective lens mount with spring-mounted, retractable specimen protection, which mount is suitable for use with both dry objective lenses and immersion objective lenses.

In this case, an outer, rigid objective lens bell has central openings through which a spring-mounted, axially displaceable mounting tube can be manipulated directly for retraction. This allows the working distance between the objective lens and the specimen to be increased without errors.

From U.S. Pat. No. 6,507,433 B2 a method and apparatus for preventing application of excessive force between microscope objective and stage is known. A proximity sensor is positioned above a carrier and is configured to detect the proximity of the carrier before the stop is reached. The sensor is arranged outside of the objective lens in a fixed part of the objective nosepiece. The signal of the sensor switches off the illumination light.

The known embodiments for protecting a specimen or for protecting the objective lens are suitable only if the drives for focusing are manually operated. However, if focusing is automatic, for example, by means of a motor-driven stage, there is a risk that, despite specimen protection, an operator might have his finger or hand crushed once the range of the spring for specimen protection has been exhausted.

Proceeding from the above, the object of the invention is to further develop an objective lens mount having specimen protection and crush protection in such a way that, in addition to preventing contact between specimen and objective lens during automated microscopy with a motorized microscope, injury to the operator is prevented. This object is attained with an objective lens mount of the type described in the introductory part and having the features of patent claim 1.

The objective lens mount comprises an outer objective lens collar, which further comprises a unit for mounting the microscope objective lens to a microscope interface. The objective lens mount further comprises a safety element which is spring mounted and axially movable in the outer objective lens collar. The safety element is enclosing the objective lens if mounted in it. For the purpose of maintaining a stand-off-distance between a front lens of the objective lens and the safety element a sensor is provided. The sensor is coupled with a drive control unit of the motorized microscope to stop the drive if the stand-off-distance is underrun.

The stand-off-distance is preferably adjustable for the usage of changeable different microscope objective lenses.

The easiest solution is to configure the sensor as opener to stop the drive or drives of the microscope immediately.

In the motorized microscope the stage and/or the objective lens can be driven by a motor in a vertical direction for variation of focus. Furthermore drives can be used for movement of the stage in horizontal direction.

Advantageous embodiments are specified in dependent claims 2 to 12.

According to a preferred embodiment of the invention, in order to obtain crush protection and specimen protection, the sensor that is coupled to the drive control unit is provided, wherein for signal emission by the sensor, a contact pressure element which is connected to the sensor via a contact pressure point (triggering point) and is adjustable in the direction of the specimen holder (along the optical axis) is advantageously provided in the safety element.

In order to achieve this, a spring range is provided. This spring range is divided into a switching range, which extends from the starting point (bottom position of the safety element, not triggered) up to the switching point (trigger point on the sensor), and the subsequent safety range from the switching point of the sensor up to the end of the spring range (top position of the safety element, mechanically fixed stop). Advantageously, the distance between the front lens of the objective and the safety element is greater than the spring range. Crushing and damage to the specimen and the objective lens are thereby prevented. The sensor is advantageously designed as a normally closed contact, and therefore, in the case of a defective sensor, it is always certain that the corresponding adjustment units (motors) will travel toward the microscope only when a signal is present. If the sensor becomes defective, it must be replaced at the factory.

The signal coming from the sensor is routed via the control element in the objective lens to the unit for mounting on an interface of the microscope having the contact surfaces. From there, the signal travels through a wiring harness to the control unit in the microscope. In this control unit, the signal is processed by the sensor, and if the signal drops off, the drive systems will be stopped.

Depending upon the task being completed by the operator, the signal can also be used for other control operations on the microscope.

For example, if with a spring range of 1.5 mm for specimen protection, the signal were to be interrupted after approximately 0.3 mm, all drive systems could be stopped. In this case, another 1.2 mm of spring range would remain as a safety margin, allowing a person operating the microscope to pull his finger back out from between the specimen and the objective lens without injury (crush protection).

An adjustment screw is expediently used for adjusting the pressure element, however this has been dispensed with here due to a lack of space, wherein other adjustment elements are also possible. In this solution, the pressure element is placed in position using an auxiliary element at the factory. Once it is in position, the pressure element is secured with a securing pin.

Around the mounting tube, an advantageously designed safety element is attached, which is in the axial direction via a screw-in ring. Thus it is possible to absorb axial fluctuations by adjusting the optical system, and to provide a constant stand-off distance between front lens and safety element. This constant stand-off distance is also advantageous for the integration of an illumination ring for a ring light in the safety element.

It is further advantageous for at least one spring element to be provided, acting in the direction of the specimen, the spring force of said spring being adjustable, wherein the spring force can be adjusted by means of spacer rings that can be installed in the spring mounting.

Advantageously, the spring element or spring elements are embodied as helical compression springs, wherein other contact pressure elements may also be formed in conjunction with implementing a spring range.

Pressure elements without spring force are also conceivable. The disadvantage of this, however, would be that the risk of injury (crushing) to the operator is very high.

In a further advantageous embodiment, in order for a signal to be emitted when the objective lens comes into contact with a specimen carrier, a pressure-sensitive film, oriented in the direction of the specimen, can be arranged on the objective lens or on the safety element as the sensor.

A proximity sensor that will emit a signal when specimens are detected that are smaller than the inner area of the illumination ring itself is advantageously arranged in an illumination ring of the objective lens.

A specimen of this type can thereby be detected when it enters into said area, resulting in a signal emission by the sensor.

It is also conceivable for the front lens to likewise be spring mounted, and to be retractable in the axial direction under contact, in the same manner as the safety element.

It is further advantageous for the unit for mounting on an interface of the microscope with the rigid objective lens collar to be implemented via a bayonet connection that acts against a stop, this interface preferably consisting of a bayonet flange and a bayonet ring. A fixedly defined stop position in the bayonet ring constantly ensures that the bayonet flange will come to rest in the correct position in the objective lens/microscope interface. The bayonet flange is formed such that it meshes over the mating contour of the bayonet ring such that, in the stop position, the unit is fixedly connected to the objective lens collar, wherein the bayonet ring has shapes that prevent axial movement between the objective lens collar and the unit in the stop position.

With this measure, more secure electronic contacting in the interface can be ensured.

It is also conceivable for the interface between objective lens and microscope to be designed with a threaded connection; however in this case, a plug-in cable is required for the electronic connection. It is also conceivable for the interface to be designed solely as a plug-in connection, and for the secure seating of the objective lens in the interface to be implemented via screws or a screw-in ring. In this case as well, a plug-in cable is required for the electronic connection.

The objective lens collar is fixedly connected to the unit for mounting on an interface of the microscope via the carrier element [26] and the mounting tube. The unit for mounting on an interface comprises a securing pin advantageously arranged appropriately near the stop.

In conjunction with the groove that is formed in the bayonet ring, it therefore is not possible for the objective lens to drop out of the interface if the objective lens is not yet in the operating position and the operator might possibly release it.

In a further advantageous embodiment, in the unit for mounting on an interface of the microscope, contact surfaces for capturing and forwarding the signals from the sensor are provided.

It would also be conceivable for a signal to be transmitted to the control unit as a result of a change in voltage on the objective lens housing, in which case the control unit could then switch off the drives. However, this would have the disadvantage that the system would have to be restarted following contact with the housing.

In what follows, the objective lens mount according to the invention will be specified in greater detail in reference to an embodiment example. The related figures show.

Figure 1:
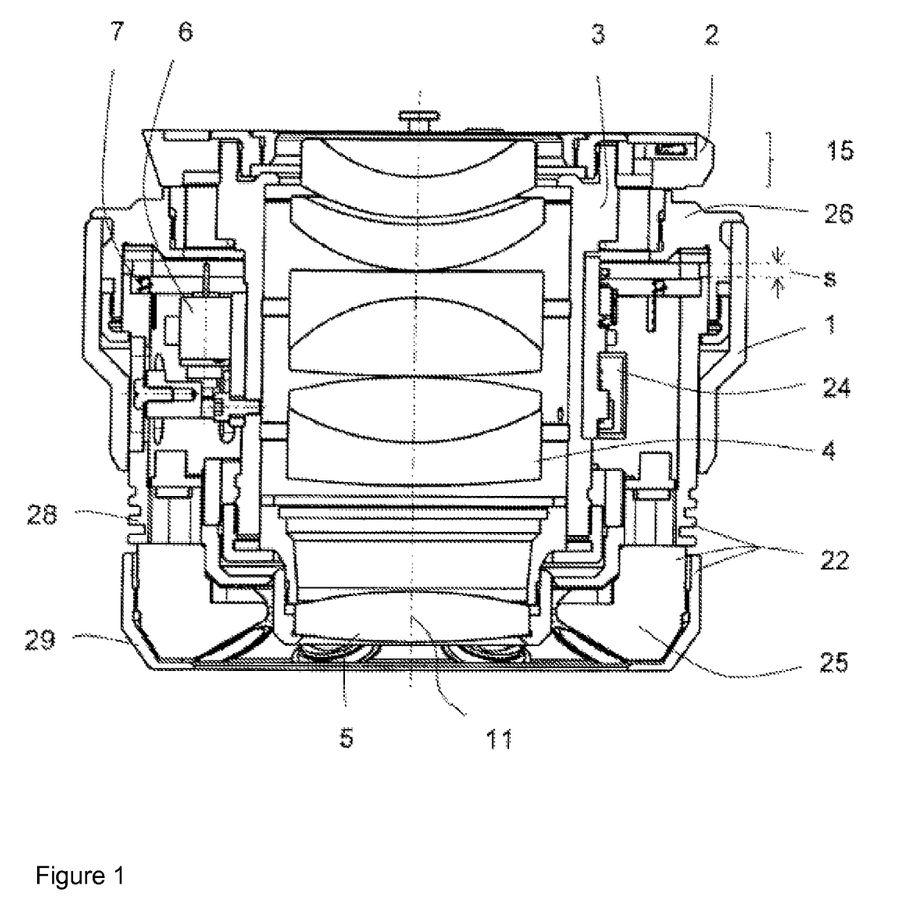
FIG. 1: a sectional diagram of the entire objective lens.

FIG. 1 shows the safety element 22 according to the invention, which is arranged spring mounted and axially movable by a spring range s, with an outer, rigid objective lens collar 1, which is connected to a unit 15 for mounting on an interface of a microscope, not shown in greater detail, via a carrier element 26, and to a mounting tube 3. The safety element 22 comprises a carrier tube 28, a contact pressure element 9 (in FIG. 2), an illumination ring 25 and an end element 29. Within the objective lens collar 1, the safety element 22 and the carrier element 26 is the mounting tube 3, in which an objective lens 4 is held.

Also clear from FIG. 1 is the arrangement of a the arrangement of the contact pressure element 9 and the sensor 6, which are designed to prevent crushing and to protect the specimen and the objective lens 4. The sensor 6 is fixedly attached to the mounting tube 3. The sensor (microswitch) 6 with its triggering mechanism for signal emission is illustrated in greater detail in FIG. 2. The spring-mounted arrangement of the safety element 22 is implemented in this case via compression springs 7 acting in the direction of the specimen, which are illustrated in greater detail in FIG. 4.

Figure 2:
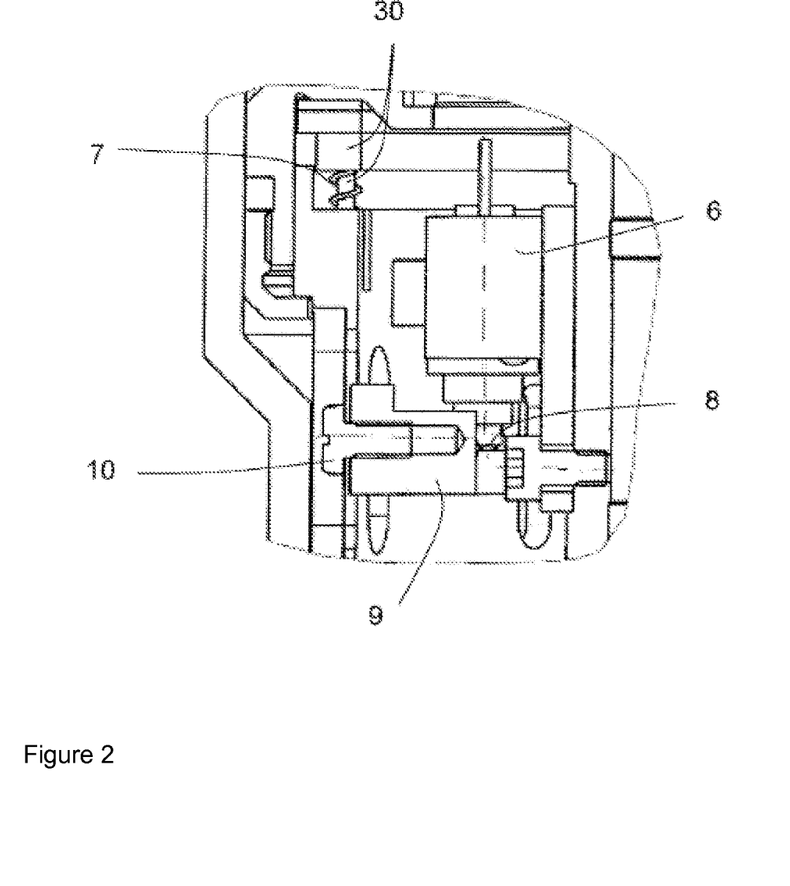
FIG. 2: a diagram showing the arrangement of the sensor and the contact pressure element in the objective lens.

FIG. 2 shows the sensor 6 and the triggering mechanism that is required for signal emission. Said mechanism consists of a pressure element 9 which is connected to the sensor 6 via a contact pressure point (triggering point) 8 and is adjustable in the direction of the specimen holder. The pressure element 9 is held securely in position in the safety element 22 via a securing pin 10.

The path of the pressure element 9 up to the triggering point 8 on the sensor 6 is then advantageously adjusted as follows. The safety element 22 must be adjusted in advance to the correct distance from the front lens 5. This is necessary, as has already been mentioned, because adjusting the optical system of the objective lens 4 causes the position of the front lens 5 in relation to the unit 15 to fluctuate. However, the free working distance between the front lens 5 and the specimen remains the same. It is therefore necessary only to adjust the preset distance between front lens 5 and end element 29 by means of the screw-in ring 14, for which purpose the spring(s) 7 press the carrier tube 28 (from 22) against the screw-in ring 14. Thus the safety element 22 is likewise adjusted to the correct height. The pressure element 9 held in the safety element 22 is then positioned (with the help of an auxiliary tool) such that the triggering point 8 on the sensor 6 is advantageously reached after a distance of 0.3 to 0.5 mm in the axial direction. The remaining distance of the spring range s of 1 to 1.2 mm then serves for protection against crushing.

The sensor 6 in this case emits a signal via contact pressure point 8, which signal is conducted via cable (lines) up to the contact surfaces 21 and from there is forwarded to a control unit (not shown) and processed accordingly. For example, certain drive units, such as those for introducing the focusing movement, may be switched off so that damage to the specimen, the objective lens 4 or the operator can be prevented.

Figure 3:
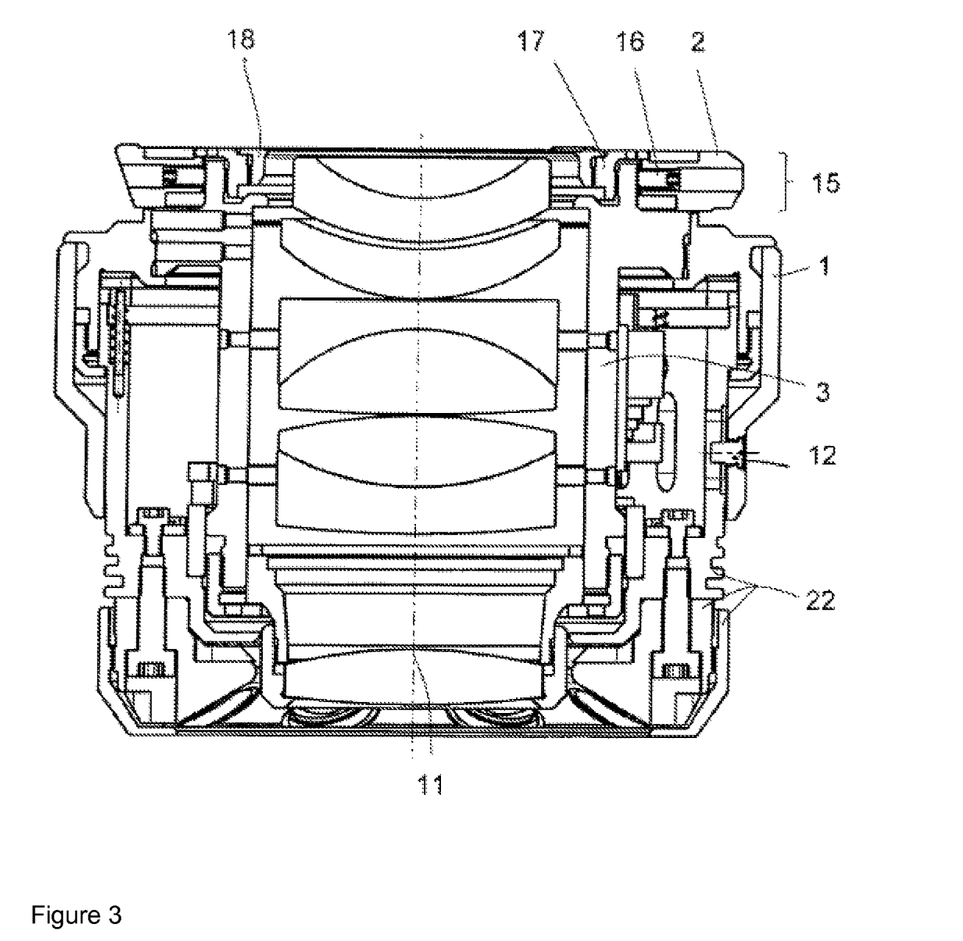
FIG. 3: a diagram showing the protection against rotation between the objective lens collar and the safety element.

FIG. 3 shows a diagram of an anti-rotation device between the objective lens collar 1 and the safety element 22. In the present embodiment example, this is implemented by means of a screw 12, which is inserted into the objective lens collar, perpendicular to the optical axis 11 of the objective lens 4, and engages in the safety element 22 such that rotation in the opposite direction is prevented. Depending upon the type of sensor system used, it is also conceivable to dispense with the anti-rotation device.

FIG. 3 further shows the unit 15 for mounting on an interface of the microscope via a bayonet flange 2 (on the objective lens side), wherein the securing pin 19 engages in a concentric circular arc with an insertion opening, as a groove 32 of the bayonet ring (in FIG. 9) (on the microscope side).

Figure 4:
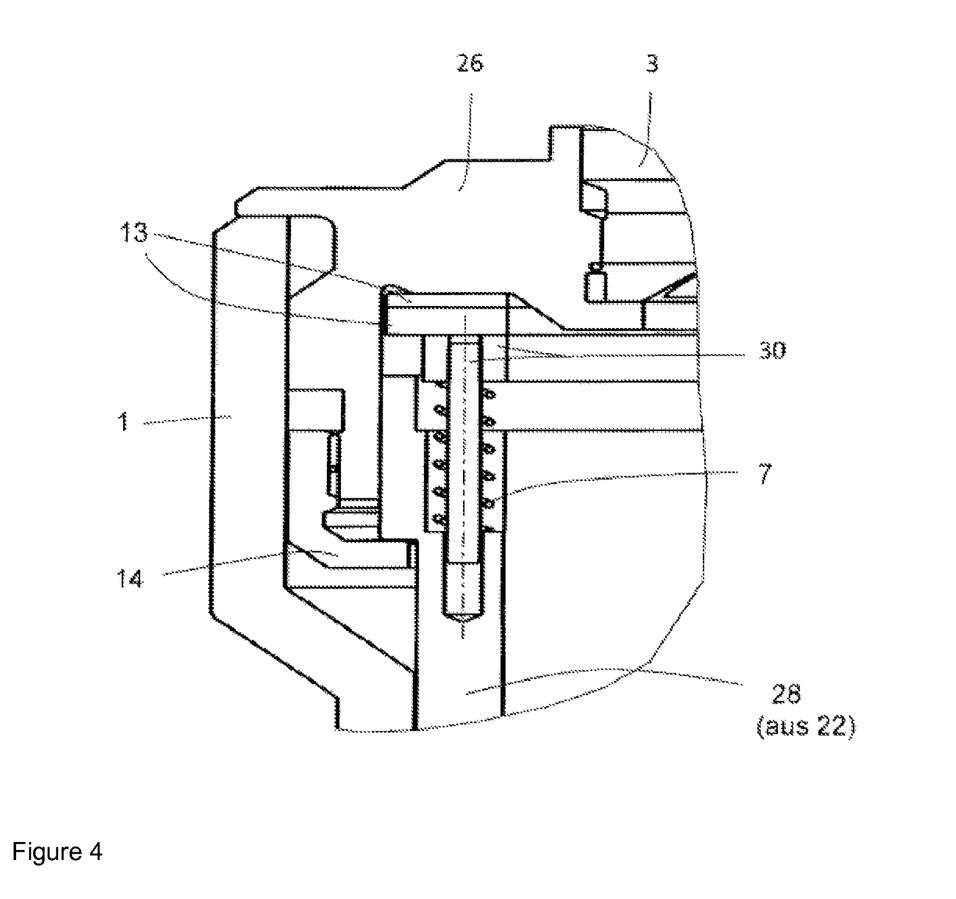
FIG. 4: a diagram showing the spring element.

FIG. 4 shows the spring element 7 in greater detail. It is designed as a helical compression spring, the spring force of which is adjustable by means of spacer rings 13 which can be inserted into a spring cage 30. FIG. 4 further illustrates the height adjustment (axial movement) of the safety element 22 within the objective lens collar 1 by means of a screw-in ring 14.

Figure 5:
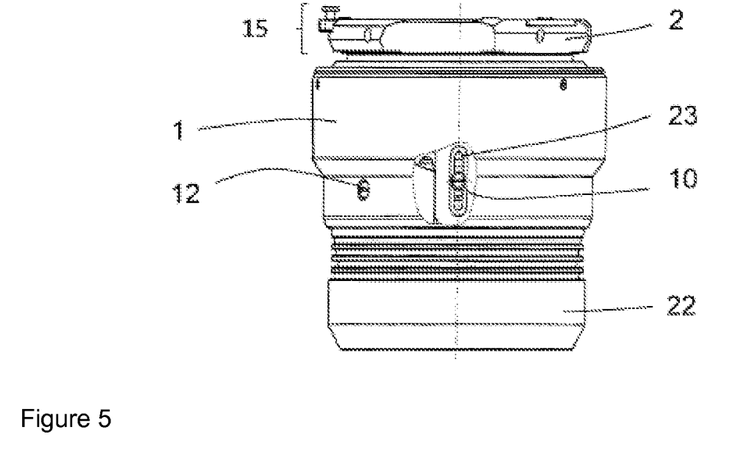
FIG. 5: a diagram of the objective lens collar and the unit for mounting on an interface of the microscope with the screw for protection against rotation between the objective lens collar and the safety element, and the elongated opening in which the contact pressure element is guided.

FIG. 5 shows the entire objective lens 4 in the closed state, with the objective lens collar 1 partially cut away in order to illustrate the contact pressure element 9 with the securing pin 10, the unit 15 for mounting on an interface of the microscope, and the anti-rotation device between objective lens collar 1 and safety element 22 by means of screw 12.

Figure 6:
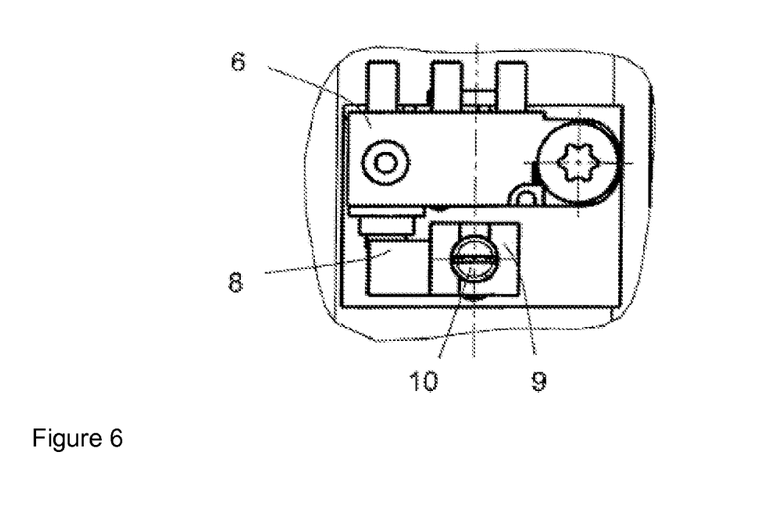
FIG. 6: a diagram showing the sensor unit with contact pressure element.

FIG. 6 shows the sensor 6 designed as a microswitch, similarly to FIG. 2, from a different view. It shows the adjustable contact pressure element 9, which is fixed via securing pin 10 in the safety element 22, and contact pressure point (triggering point) 8.

Figure 7:
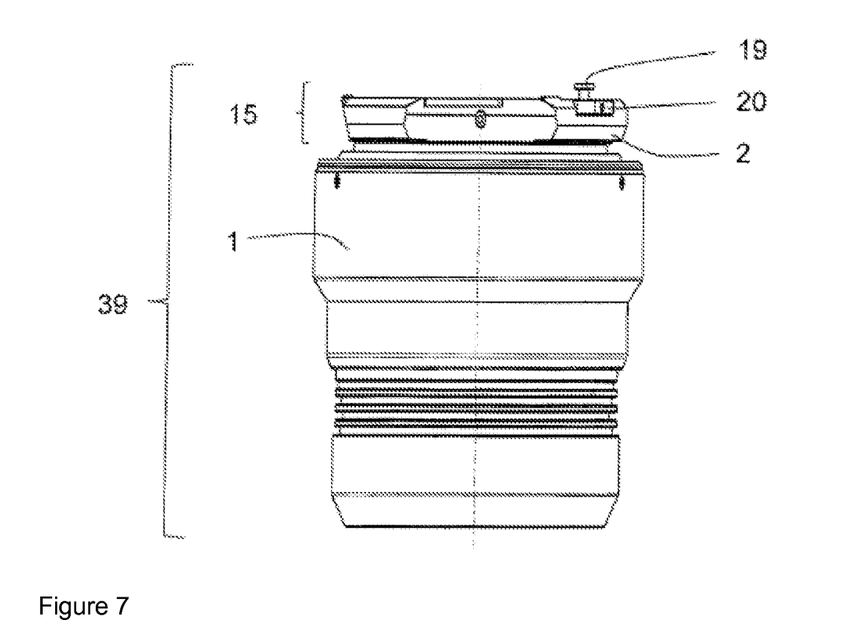
FIG. 7: a further diagram of the objective lens collar and the unit for mounting on an interface of the microscope.

FIG. 7 shows the entire objective lens 4 in its closed state, with the objective lens collar 1 and the unit 15 for mounting on an interface of the microscope, which unit is connected via screw-in ring 17 (FIG. 3) on the mounting tube 3 and the carrier element 26 (FIG. 1) to the objective lens collar 1. Also shown is a securing pin 19, which serves to prevent the objective lens 4 from falling out when the objective lens is in position inserted into the interface.

Figure 8:
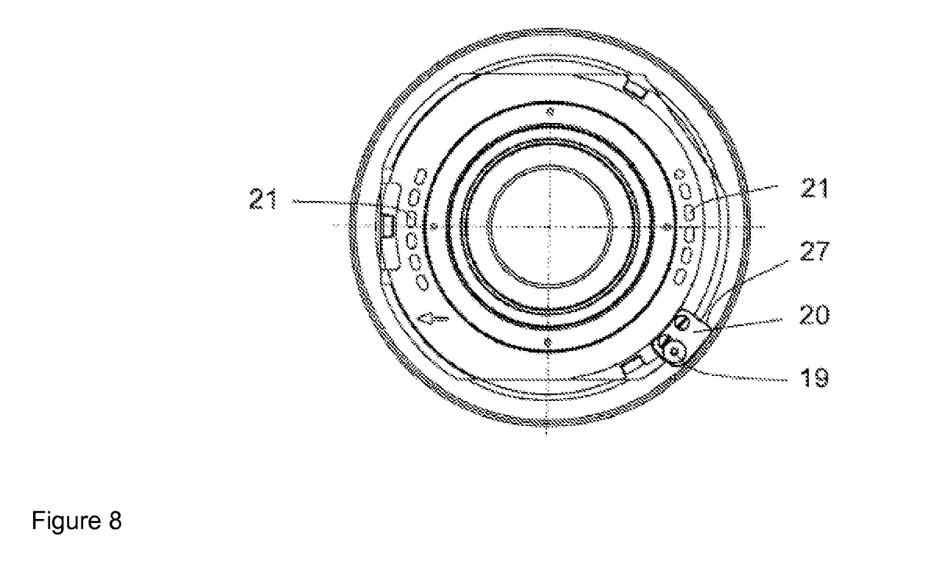
FIG. 8: a diagram showing the unit for mounting on an interface of the microscope with the electronic contact surfaces.

FIG. 8 shows this unit 15 from a plan view with a stop plate 20 of the unit 15, which plate serves as a stop, and the securing pin 19. FIG. 8 further shows contact surfaces 21, at least one contact surface 21 of which serves to capture and forward the signals from the sensor 6. Contact pins 34 (FIG. 9) receive the signal transmission from these contact surfaces 21, and the signal travels from there to the control unit.

Figure 9:
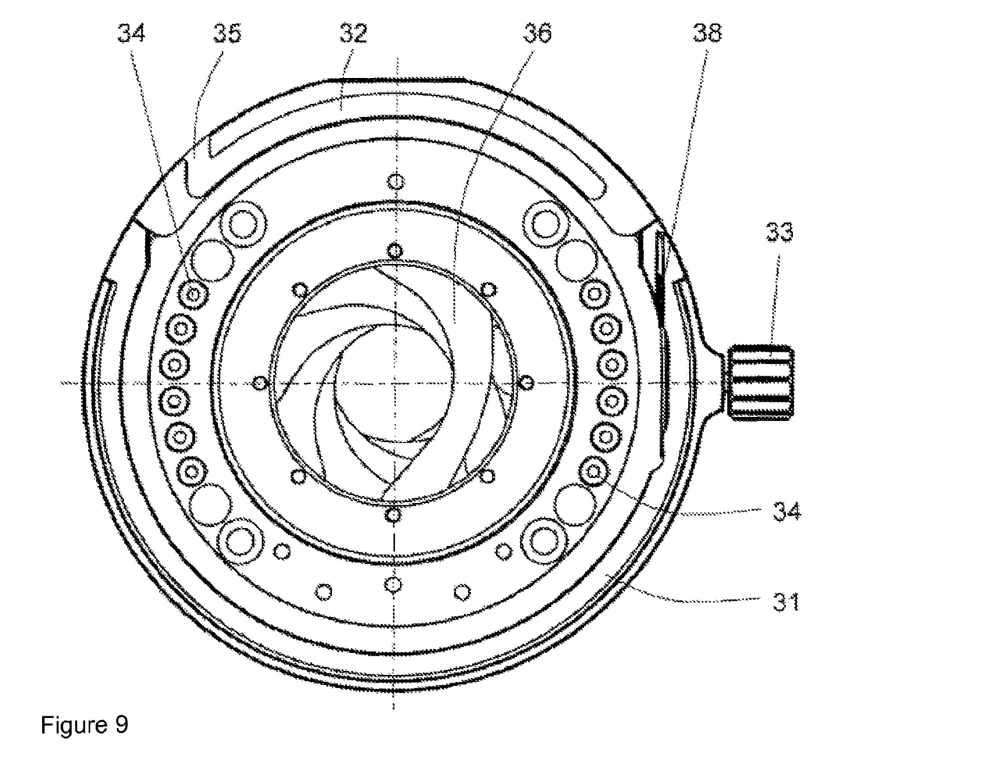
FIG. 9: a diagram of part 2 of the objective lens/microscope interface on the microscope side

FIG. 9 shows the part 2 of the objective lens/microscope interface on the microscope side. This interface advantageously consists of a bayonet ring 31, an insertion opening 35 and the groove 32 for the securing pin 19 of the unit 15. Also shown are the contact pins 34, which are situated opposite the contact surfaces 21 when the objective lens 4 is screwed in. The objective lens 4 is held and secured in the interface via a spring element 38, which acts on the angled surfaces of the bayonet flange 2 of the objective lens 4. Additionally, the objective lens 4 can be prevented from moving in the interface by means of a pin 33 for countering vibrations in the microscope. This bayonet ring 31 can likewise accommodate an iris diaphragm 36, which can advantageously be used as an aperture diaphragm.

Figure 10:
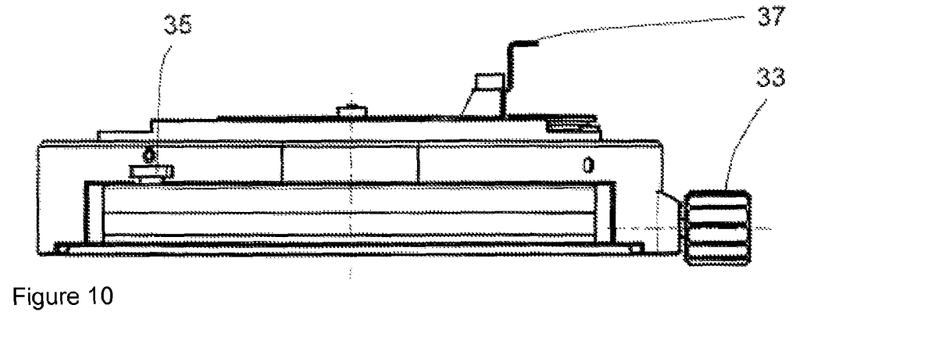
FIG. 10: a diagram showing a lug with which an iris diaphragm can be referenced.

FIG. 10 also shows a lug 37 with which the iris diaphragm 36 can be referenced. Thus this iris diaphragm 36 can also be actuated automatically. This actuation can be implemented via a cable control mechanism, for example; however, this mechanism is not shown here.

LIST OF REFERENCE SIGNS 1 objective lens collar
2 bayonet flange (part 1 of the interface, on the objective lens side)
3 mounting tube
4 objective lens
5 front lens
6 sensor (microswitch)
7 compression spring
8 contact pressure point (triggering point)
9 pressure element
10 securing pin—screw
11 optical axis
12 screw, pin (for anti-rotation purposes)
13 spacer ring
14 screw-in ring
15 unit for mounting on an interface of the microscope (includes 2; 19; 20 and 21)
16 groove in mounting tube 3, the sole purpose of which is to hold the threading of the screw-in ring 17 long enough, centering pins for adjusting the image status of objective lens 4
17 screw-in ring for securing the unit [15] on the mounting tube 3
18 end plate
19 securing pin
20 stop plate
21 contact surface
22 safety element
23 elongated opening
24 control unit in the objective lens
25 illumination ring (component of safety element 22)
26 carrier element
27 stop surface of stop plate
28 carrier tube of safety element 22
29 end element of safety element 22
30 spring cage
31 bayonet ring in microscope (part 2 of the interface, on the microscope side)
32 groove (in which securing pin 19 extends)

33 pin for countering (serves to ensure that the entire objective lens remains securely fixed in the interface under vibrations)
34 spring-mounted contact pins
36 insertion opening for securing pin 19
37 iris diaphragm (included for illustration purposes only)
lug for referencing the iris diaphragm (included for illustration purposes only)
38 spring element
39 objective lens mount
S spring range

The invention claimed is:

1. An objective lens mount with specimen protection and crush protection for an objective lens of a motorized microscope, comprising:
   an outer objective lens collar having a unit for mounting on an interface of the microscope; and
   a safety element arranged spring mounted and axially movable in the outer objective lens collar,
   wherein the safety element encloses the objective lens,
   wherein for the purpose of maintaining a stand-off distance between a front lens of the objective lens and the safety element, a sensor that is directly coupled to a drive control unit of the motorized microscope is mounted within the objective lens.

2. The objective lens mount according to claim 1, wherein for the purpose of emitting a signal by the sensor in the objective lens mount, a pressure element which is connected to the sensor via a contact pressure point (triggering point) and is adjustable in the direction of the specimen holder is provided.

3. The objective lens mount according to claim 2, wherein a securing pin is provided for fixing the pressure element in position.

4. The objective lens mount according to claim 1, wherein axial movement of the safety element is adjustable.

5. The objective lens mount according to claim 4, wherein the height adjustment of the safety element is implemented by means of a screw-in ring.

6. The objective lens mount according to claim 1, wherein at least one spring element with adjustable spring force acting in the direction of the specimen is provided.

7. The objective lens mount according to claim 6, wherein for the purpose of adjusting the spring force, spacer rings are provided.

8. The objective lens mount according to claim 6, wherein the spring element is a helical compression spring.

9. The objective lens mount according to claim 6, wherein the spring element is embodied as a pressure element in conjunction with implementing a spring range.

10. The objective lens mount according to claim 1, wherein in order to emit a signal when the safety element comes into contact with a specimen carrier, a pressure-sensitive film is arranged as a sensor in the safety element, oriented in the direction of the specimen.

11. The objective lens mount according to claim 1, wherein in an illumination ring of the safety element, a proximity sensor is provided for emitting a signal when specimens that are smaller than the inner area of the illumination ring itself are detected.

12. The objective lens mount according to claim 1, wherein the unit for mounting on an interface of the microscope with the rigid objective lens collar is implemented via a bayonet connection acting against a stop, wherein the interface consists of a bayonet flange and a bayonet ring and the bayonet flange is formed such that it meshes over the mating contour of a bayonet ring such that, in the stop position, the unit is fixedly connected to the objective lens collar, and wherein the bayonet ring has forms which prevent axial movement between the objective lens collar and the unit in the stop position.

13. The objective lens mount according to claim 1, wherein the unit is mounted on a microscope stand.

14. The objective lens mount according to claim 7, wherein the spacer rings are installed in the spring mounting.

* * * * *